(12) United States Patent
Abdollahi et al.

(10) Patent No.: US 6,278,778 B1
(45) Date of Patent: Aug. 21, 2001

(54) SYSTEM AND METHOD OF POWER LIMITING CALL PROCESSING IN TELECOMMUNICATIONS EQUIPMENT

(75) Inventors: Amir Abdollahi, Plano, TX (US); Brian L. Miller, Petaluma, CA (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/224,568

(22) Filed: Dec. 30, 1998

(51) Int. Cl.[7] .................................................. H04M 1/00
(52) U.S. Cl. ............................ 379/373; 379/377; 379/383
(58) Field of Search ........................................ 379/142, 322, 379/323, 324, 372, 373, 196, 377, 383

(56) References Cited

U.S. PATENT DOCUMENTS

| | | | |
|---|---|---|---|
| 4,593,272 | 6/1986 | Berkowitz | 340/500 |
| 5,894,508 | * 4/1999 | Kim | 379/102.4 |
| 5,956,393 | * 9/1999 | Tessler et al. | . |
| 6,041,108 | * 3/2000 | Brewster et al. | 379/196 |

FOREIGN PATENT DOCUMENTS

| | | |
|---|---|---|
| 44 20 430 C1 | 10/1995 | (DE) . |
| 0 452 286 A1 | 10/1991 | (EP) . |
| 0 643 524 A1 | 3/1995 | (EP) . |

OTHER PUBLICATIONS

"Electronic Switching Studies in Telecommunications", NL, Amsterdam, Elseier Science Publication, vol. 2, 1981, pp. 413–415, XP002130357.

* cited by examiner

*Primary Examiner*—Ahmad F. Matar
*Assistant Examiner*—Bing Bui
(74) *Attorney, Agent, or Firm*—Baker Botts L.L.P.

(57) ABSTRACT

A system and method of limiting power consumption in a telecommunications equipment coupled between a plurality of far end subscriber lines and a plurality of near end subscriber lines are provided. The method includes monitoring and determining a number of ringing subscriber lines, comparing the number of ringing subscriber lines to a predetermined ringing threshold, monitoring and determining a number of off-hook subscriber lines, comparing the number of off-hook subscriber lines to a predetermined off-hook threshold, and blocking further ringing and/or off-hook subscriber lines in response to the number of ringing and/or off-hook subscriber lines reaching or exceeding the respective predetermined ringing and off-hook thresholds.

22 Claims, 3 Drawing Sheets

SYSTEM AND METHOD OF POWER LIMITING CALL PROCESSING IN TELECOMMUNICATIONS EQUIPMENT

TECHNICAL FIELD OF THE INVENTION

This invention is related in general to the field of telecommunications equipment. More particularly, the invention is related to a system and method of power limiting call processing in telecommunications equipment.

BACKGROUND OF THE INVENTION

The Internet and the proliferation of many forms of customer premises equipment have prompted increasing demand for subscriber connections to the telecommunications network. Existing copper cabling carrying a single voice or data channel have traditionally been used to connect subscribers to the central office. Because the expense associated with placing additional copper cabling from the central office to the subscribers is prohibitive, a solution to provide additional subscriber connections with existing copper cabling is the pair gain equipment. The pair gain equipment enables the same copper cabling or twisted pair to carry multiple channels of telecommunications traffic signals to multiple subscriber lines from the central office.

Related technical references includes Bellcore GR-303-CORE, Generic Requirements for Integrated Digital Loop Carrier System, Issue Sep. 1, 1995; TR-NWT-000057, *Functional Criteria for Digital Loop Carrier Systems*, Issue Jan. 2, 1993; TR-TSY-000008, Digital Interface Between SLC 96 Digital Loop Carrier and a Local Digital Switch, Issue Aug. 2, 1987, Revision Sep. 1, 1993; and ANSI T1.401, Interface Between Carriers and Customer Installations Analog Voicegrade Switched Access Lines Using Loop-Start and Ground-Start Signalling, 1988. These references are incorporated herein by reference.

SUMMARY OF THE INVENTION

Accordingly, there is a need for pair gain equipment that enables adding subscriber lines without the additional expenses of placing copper cabling. Such pair gain equipment may take advantage of existing copper cabling to obtain supply power from a remotely located network power supply. In such a configuration, the number of twisted pairs devoted to supply remote power must be balanced with the number of twisted pairs devoted to carrying voice, video and data signals in order to provide the maximum number of subscriber lines. Accordingly, power consumption must be balanced with the amount of power that can be delivered on the fixed number of twisted pairs to the access multiplexing terminal.

In one aspect of the invention, a method of power limiting call processing in a telecommunications equipment coupled between a plurality of far end subscriber lines and a plurality of near end subscriber lines includes monitoring and determining a number of ringing subscriber lines, comparing the number of ringing subscriber lines to a predetermined ringing threshold, blocking further ringing on subscriber lines in response to the number of ringing subscriber lines reaching or exceeding the predetermined ringing threshold, and providing a reorder signal to a blocked ringing far end subscriber line.

In another aspect of the invention, an access multiplexing terminal coupled between a central office and a plurality of subscribers includes a first plurality of line cards coupled to a plurality of subscriber lines, a second plurality of line cards, a first plurality of twisted pairs coupling the second plurality of line cards to the central office, a second plurality of twisted pairs coupling the access multiplexing terminal to a network power supply, and a bandwidth allocator monitoring a number of ringing subscriber lines and a number of off-hook subscriber lines, the bandwidth allocator blocking further ringing and off-hook subscriber lines in response to the numbers thereof exceeding predetermined ringing and off-hook thresholds.

In yet another aspect of the invention, a system and method of limiting power consumption in a telecommunications equipment coupled between a plurality of far end subscriber lines and a plurality of near end subscriber lines are provided. The method includes monitoring and determining a number of ringing subscriber lines, comparing the number of ringing subscriber lines to a predetermined ringing threshold, monitoring and determining a number of off-hook subscriber lines, comparing the number of off-hook subscriber lines to a predetermined off-hook threshold, and blocking further ringing and/or off-hook subscriber lines in response to the number of ringing and/or off-hook subscriber lines reaching or exceeding the respective predetermined ringing and off-hook thresholds.

BRIEF DESCRIPTION OF THE DRAWINGS

For a better understanding of the present invention, reference may be made to the accompanying drawings, in which.

DETAILED DESCRIPTION OF THE INVENTION

Figure 1:
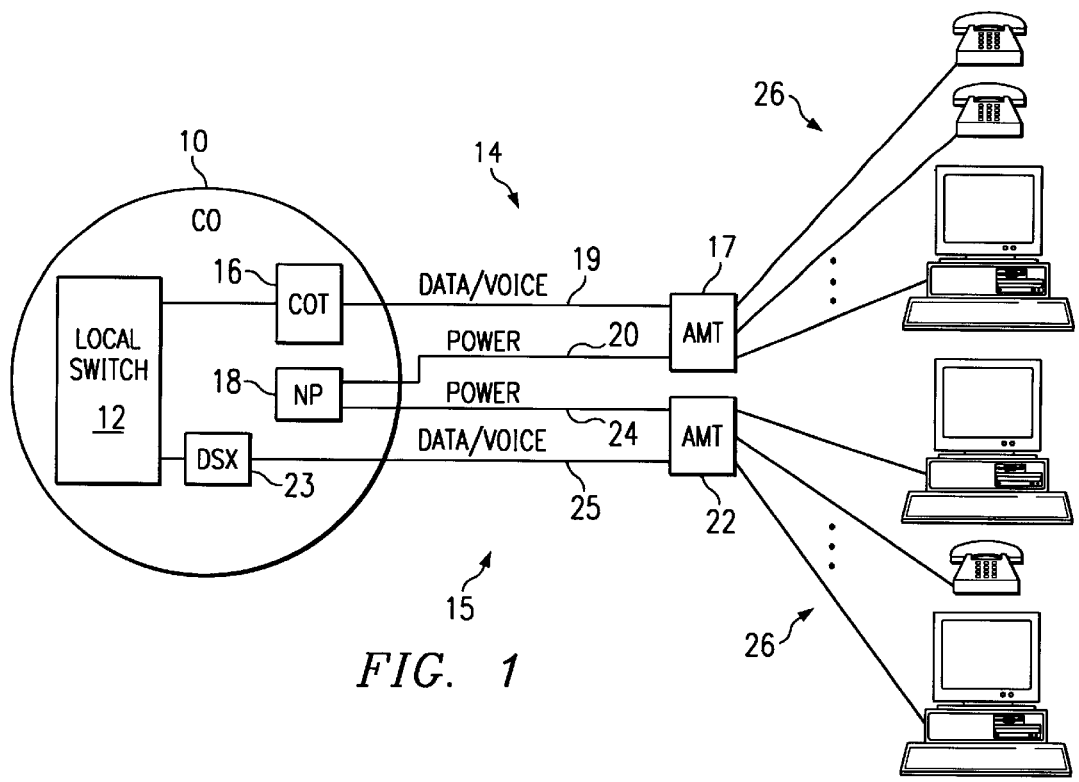
FIG. 1 is a simplified block diagram of telecommunications equipment in the carrier access area according to the teachings of the present invention.

The preferred embodiments of the present invention are illustrated in FIGS. 1–4, like reference numerals being used to refer to like and corresponding parts of the various drawings.

Referring to FIG. 1, a simplified block diagram of the operating environment of the pair gain equipment is shown. A central office 10 includes a local switch 12, which is coupled to pair gain equipment 14 and 15. Pair gain equipment 14 includes a central office terminal (COT) 16 and a remote terminal or an access multiplexing terminal (AMT) 17. Pair gain equipment 15 includes only an access multiplexing terminal 22. Central office terminal 16 is coupled to local switch 12 and is coupled to access multiplexing terminal 17 via copper twisted pairs 19 carrying data, voice, video and other forms of traffic. Access multiplexing terminal 17 is powered by a remotely located network power source (NP) 18, which may be located in central office 10, as shown, or elsewhere. Copper twisted pairs 20 carry network power to access multiplexing terminal 17.

Access multiplexing terminal 22 of pair gain equipment 15 may also couple directly to local switch 12 through a digital cross-connect (DSX) 23. Access multiplexing terminal 22 is also powered by network power source 18 transmitted via a predetermined number of copper twisted pairs 24. Telecommunications traffic are transmitted between local switch 12 and access multiplexing terminal 22 via a predetermined number of copper twisted pairs 25. A number of subscribers 26 are coupled to access multiplexing terminals 17 and 22.

The number of copper twisted pairs used for carrying telecommunications traffic and the number of copper twisted pairs used for carrying power are balanced to provide the maximum feasible number of subscriber connections. Because the number of copper twisted pairs available is fixed, it is a limited resource that is required to carry both live traffic and power to the access multiplexing terminals. Each copper twisted pair may be used to carry one T1, an HDSL (high-bit-rate digital subscriber line), or power for a limited number of circuits. The amount of power required to support the access multiplexing terminals is dependent on the activity level of the circuits or the subscriber lines. In particular, the amount of power drawn is dependent on how many subscribers lines are off-hook, how many subscriber lines are ringing, and whether certain line card components are active or on standby.

Figure 2:
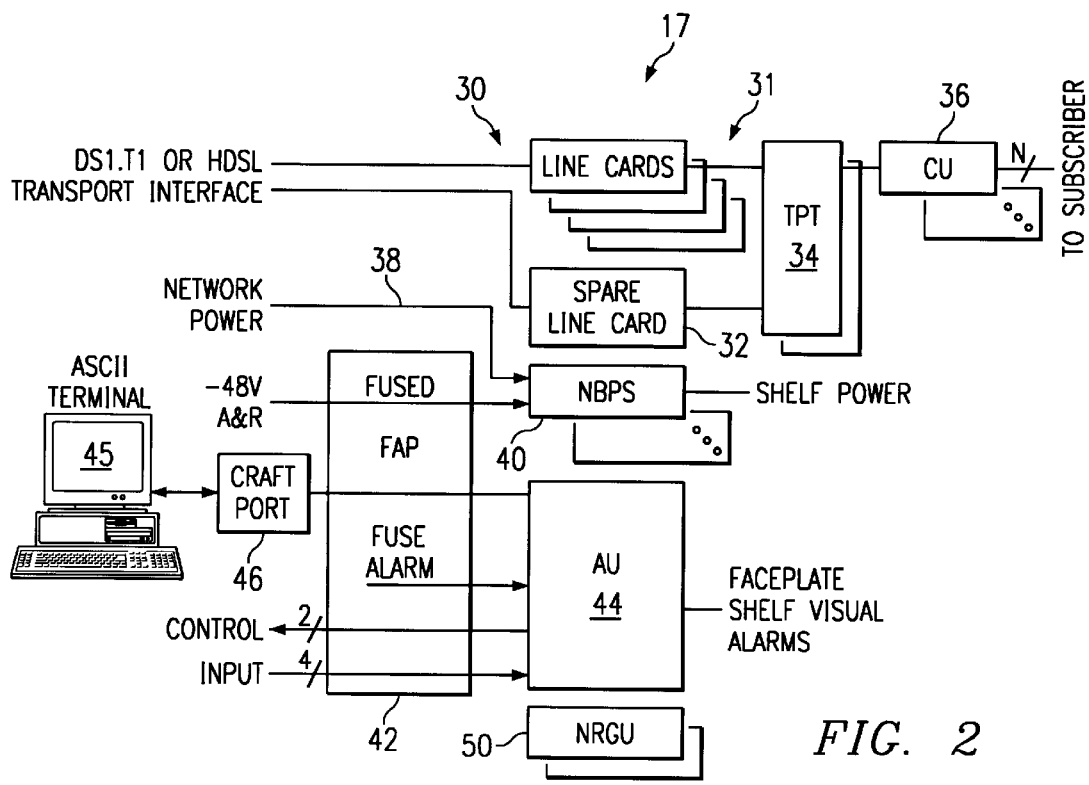
FIG. 2 is a functional block diagram of the access multiplex terminal according to the teachings of the present invention.

Referring to FIG. 2, a functional block diagram of access multiplexing terminal 17 or 22 is shown. The description of the access multiplexing terminal hereinafter will refer to access multiplexing terminal 17 only, with the understanding that access multiplexing terminal 22 is similarly or equally constructed and operated. Access multiplexing terminal 17 includes line cards 30 which includes a predetermined number of active line cards 31 and at least one additional spare line card 32 for protection purposes. Line cards 30 includes line transceivers and framers and are coupled to DS1, T1, or HDSL transport interfaces. Line cards 30 are also coupled to one or more terminal processor and time slot interchangers (TPTs) 34, which may provide the functionality of shelf processor, DS0 timeswitch, shelf timing, datalink control, and tone generation. Terminal processor and time slot interchangers 34 manages the system's TR-008 interface over redundant subscriber buses to the transport units and directs the traffic to and from the appropriate narrowband channel units. Terminal processor and time slot interchangers 34 are in turn coupled to channel units 36, which are coupled to the subscriber equipment. Channel units 36 include slots for a number of line cards, including remote plain old telephone service (RPOT) line cards.

The remote plain old telephone service line cards (not shown) include a number of detectors. A loop current detector senses the off-hook condition at a telephone set. A ring trip detector senses when the telephone set goes off-hook during ringing. The remote plain old telephone service line cards also include a ringing relay, which is controlled by signaling from the central office terminal end to connect ringing to the subscriber line.

Network power arrives on copper twisted pairs 38, which may be at −130 volts. This DC network power is supplied to one or more network bank power supplies (NBPS) 40, which perform DC to DC conversion from the network power level to the required regulated voltages for channel units 36 and common equipment cards. network bank power supplies 40 load share on the output.

A fuse and alarm panel (FAP) 42 is provided. Fuse and alarm panel 42 includes a fuse alarm and a number of alarm switches or contacts which close when certain monitored conditions reach or exceed predetermined thresholds. For example, the all channel busy condition causes a loop closure to a switch located on fuse and alarm panel 42.

An alarm unit (AU) 44 communicates with fuse and alarm panel 42. Alarm unit 44 interfaces with fuse and alarm panel 42 which may include the craft interface connection, a predetermined number of alarm inputs used as environmental sense points, and a number of control closure outputs. Alarm unit 44 monitors the power supply, provides craft interface to a craft terminal 45 via a craft port 46. Alarm unit 44 coordinates the alarm and maintenance functions at craft terminal 45. Alarm unit 44 further provides visual indicators such as different colored LEDs located on a faceplate of access multiplexing terminal 17.

A network ringing generator unit (NRGU) 50 converts the −48 volts DC backplane supply into a sine wave output suitable for ringing subscriber telephones. Typically the ringing voltage is approximately between 56 and 60 volts. Because power is required to ring the subscriber equipment, the number of telephone sets ringing at any one time is limited as so the total system power usage does not exceed the amount of power delivered on the twisted copper pairs.

There are two thresholds used to monitor and limit power usage. One threshold limits the number of subscriber lines that are off-hook, the other threshold limits the number of subscriber lines that are ringing. These thresholds may be set through provisioning. When these thresholds are reached, the access multiplexing terminal enters into a blocking mode of operation to limit power consumption. TABLE A below provides the relationship between the two thresholds and the state of the ring relay and subscriber line interface circuit (SLIC) in the line card.

TABLE A

| Off-Hook Threshold Reached | Ringing threshold Reached | State of Ring Relay in the Line Card | State of SLIC in the Line Card |
| --- | --- | --- | --- |
| No | No | ON | ACTIVE |
| No | Yes | OFF | ACTIVE |
| Yes | No | OFF | STANDBY |
| Yes | Yes | OFF | STANDBY |

When the interface circuit is ACTIVE, the activity on the line is processed by the line card and the interface circuit draws more power when the subscriber goes off-hook. If the interface circuit is in STANDBY mode, less power is drawn. In STANDBY mode, the interface circuit is still capable of sensing activity on the line. When the ring relay is on, the subscriber telephone set rings in response to ringing signal. When the relay is off, the telephone ringing is blocked but the line card is still able to sense when ringing starts and stops. The term subscriber herein is used to refer to near end subscribers 24 coupled to access multiplexing terminals 17 and 22.

Figure 3:
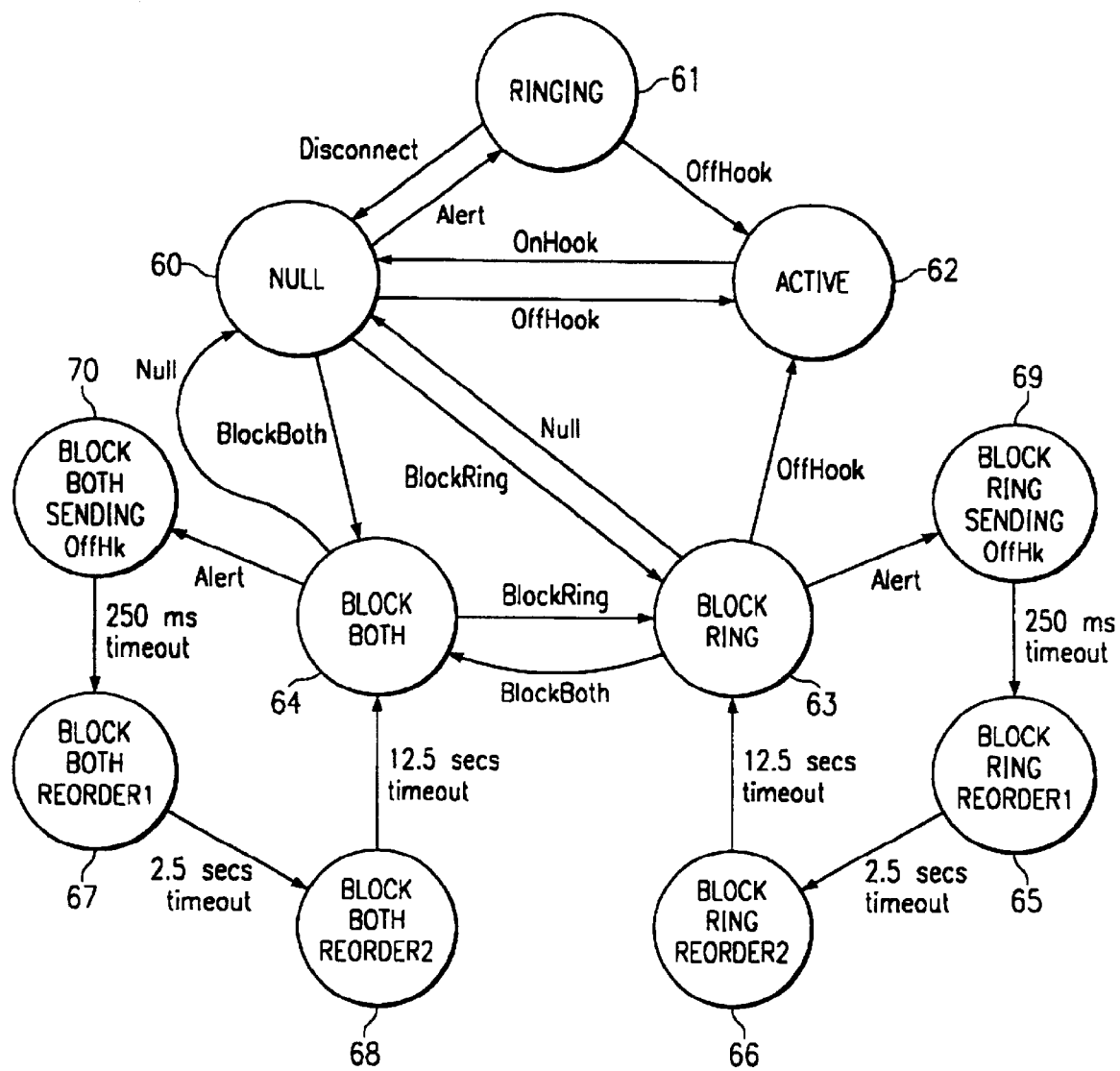
FIG. 3 is a state transition diagram of an exemplary embodiment of a method of power limiting call processing according to the teachings of the present invention.

Referring to FIG. 3 and TABLE B, a state transition diagram of power limiting call processing is shown. The state diagram describes the states and state transitions for a single subscriber line. However, some states in the state machine are reached when certain conditions concerning the entire access multiplexing terminal become true. The "ref. no." column in TABLE B refers to the reference numerals used in FIG. 3 to identify the various states.

TABLE B

| Ref. No. | State | Ring Relay | SLIC | State Description |
|---|---|---|---|---|
| 60 | NULL | ON | ACTIVE | Idle but active |
| 61 | RINGING | ON | ACTIVE | Ringing signal is being received |
| 62 | ACTIVE | ON | ACTIVE | Line is carrying traffic |
| 63 | BLOCK RING | OFF | ACTIVE | Ringing threshold reached - ringing blocked |
| 64 | BLOCK BOTH | OFF | STANDBY | Reorder signal provided to far end if an alert message is received |
| 65 | BLOCK RING REORDER 1 | OFF | STANDBY | First reorder time period of reorder tone and signaling |
| 66 | BLOCK RING REORDER 2 | OFF | STANDBY | Second reorder time period; signaling may be different than the first reorder time period. |
| 67 | BLOCK BOTH REORDER 1 | OFF | STANDBY | First reorder time period of reorder tone and signaling |
| 68 | BLOCK BOTH REORDER 2 | OFF | STANDBY | Second reorder time period; signaling may be different than the first reorder time period |
| 69 | BLOCK RING SENDING OFF-HOOK | OFF | STANDBY | Connect off-hook signaling to the far end and start a 250 ms timer |
| 70 | BLOCK BOTH SENDING OFF-HOOK | OFF | STANDBY | Connect off-hook signaling to the far end and start a 250 ms timer |

TABLE C below provides a summary description of the events shown in FIG. 3.

TABLE C

| Event | Description |
|---|---|
| Alert | Alert message is sent to the bandwidth allocator by the line card when it receives a ringing signal |
| Disconnect | Disconnect message is sent to the bandwidth allocator by the line card when the line card senses that ringing has stopped without a ring trip |
| Off-Hook | Line card sends this message to the bandwidth allocator when the near end subscriber goes off-hook or a ring trip occurs. When a ring trip occurs this is the only message that should be sent. No disconnect message is sent to the bandwidth allocator. |
| On-Hook | Line card sends this message to the bandwidth allocator when the near end subscriber goes on-hook. |
| Reorder 2 Timeout | A second reorder time period timer is started when reorder tone is supplied to the far end subscriber in reorder 2 state. |
| Reorder 1 Timeout | A first reorder time period timer is started when reorder tone is supplied to the far end subscriber in reorder 1 state. |
| Blocking State Message | This message is sent to each line card by the bandwidth allocator. The state of all subscriber lines on the line card is specified in this message. |

NULL state 60 is idle but active. In NULL state 60, the ring relay is on and the subscriber line interface card is active. When an alert event occurs as when an alert message is sent by the line card and received by the bandwidth allocator, a transition to a RINGING state 61 is made. RINGING state 61 is characterized by ringing signals being received. A disconnect event in RINGING state 61 causes a state transition back to NULL state 60. The disconnect event is caused by a disconnect message being sent by the line card and received by the bandwidth allocator. An off-hook event occurring during RINGING state 61 causes a transition to an ACTIVE state 62. The off-hook event may be indicative of an off-hook message being received by the bandwidth allocator, which indicates that the subscriber has gone off-hook in response to the ringing. ACTIVE state 62 is characterized by a line or channel that is carrying live traffic. An on-hook event occurring at this point causes a state transition back to NULL state 60. From NULL state 60, an off-hook event would cause a state transition to ACTIVE state 62.

Whenever the bandwidth allocator receives an off-hook or ringing message from a line card, it checks its database to determine whether a total call completion seconds threshold value has been reached. The call completion seconds threshold is preset to establish a total power consumption limit. Further, the receipt of an off-hook message causes a off-hook count to be incremented and the receipt of an on-hook message causes the off-hook count to be decremented. The off-hook count is compared with the off-hook threshold after each increment to determine whether the threshold has been reached. Similarly, the receipt of a ringing message causes a ringing count to be incremented and the receipt of an off-hook message or a disconnect message causes the ringing count to be decremented. The ringing count is compared with the ringing threshold after each increment to determine whether the threshold has been reached. Therefore, the number of lines off-hook and the number of lines ringing are maintained by the bandwidth allocator to determine whether the respective thresholds have been reached.

From NULL state 60, the occurrence of a block ring event prompts a state transition to a BLOCK RING state 63. The block ring event is characterized by the number of lines ringing reaching the ringing threshold. In BLOCK RING state 63, additional ringing on any line is blocked until an event occurs that enables an exit from the BLOCK RING state. For example, an off-hook event causes the ringing count to be decremented and further causes a state transition to ACTIVE state 62. An alert event indicative of an additional ringing line causes a transition from BLOCK RING state 63 to BLOCK RING SENDING OFF-HOOK state 69. BLOCK RING SENDING OFF-HOOK state 69 is the state in which additional ringing lines above the ringing threshold is processed. This process may be referred to as reorder signal processing. The reorder signal may be a tone of a predetermined frequency and pattern or an announcement.

From NULL state 60, a block both event causes a state transition to a BLOCK BOTH state 64. In BLOCK BOTH state 64, the receipt from a line card an alert message causes the transition to a BLOCK BOTH SENDING OFF-HOOK state 70. In BLOCK BOTH SENDING OFF-HOOK state 70, any additional ringing line as indicated by an alert message causes reorder signal processing.

Figure 4:
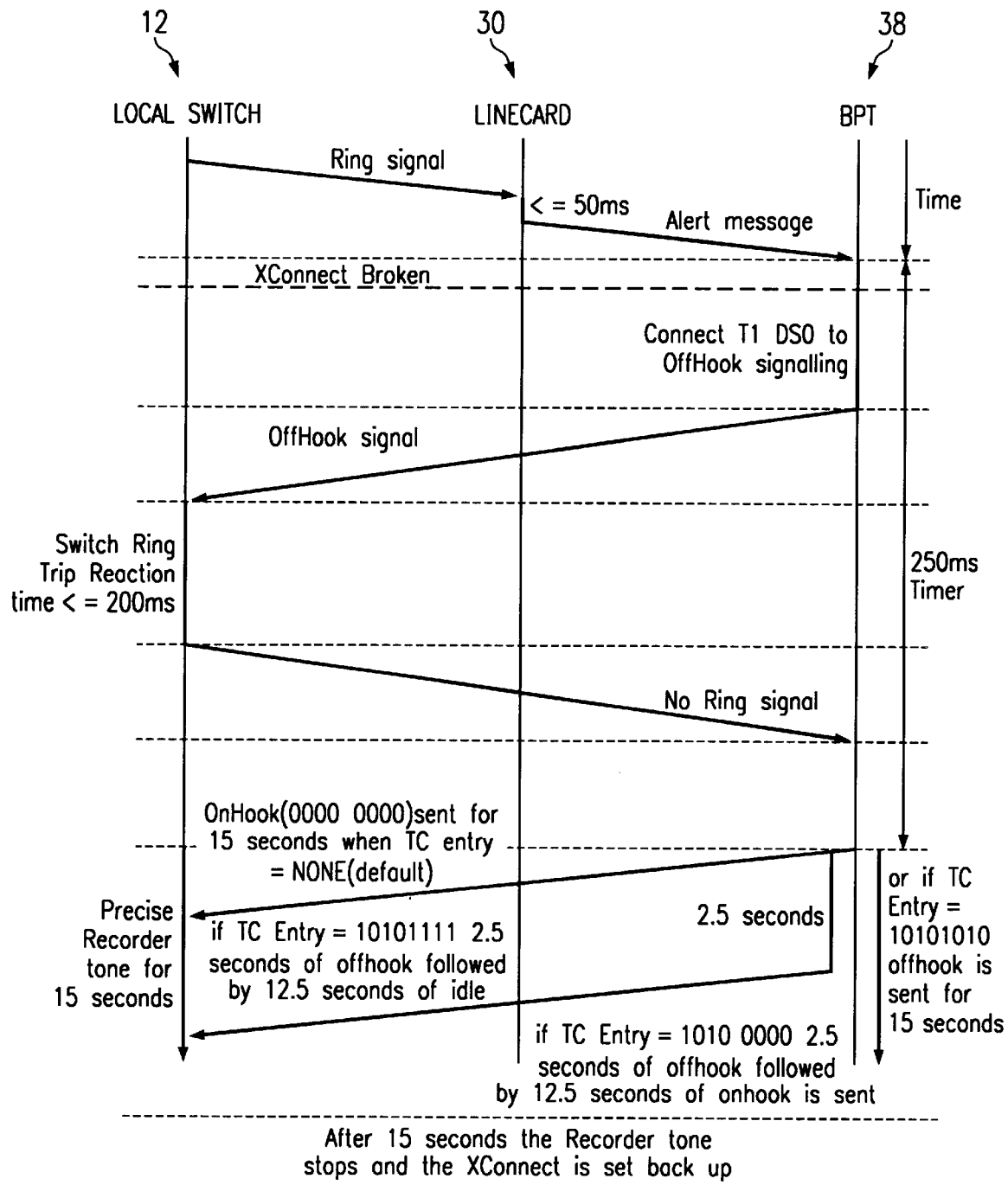
FIG. 4 is a data flow diagram of an exemplary embodiment of reorder signal processing according to the teachings of the present invention.

Referring also to FIG. 4, a diagram showing a reorder signal processing of above-threshold conditions is shown. Local switch 12 trips ringing on a line at its end, which is detected by line card 30. Line card 30 sends an alert message to bandwidth allocator 38. When there is an all channel busy condition, bandwidth allocator 38 responds by connecting the ringing line to off-hook signaling, which causes an off-hook signal to be sent to local switch 12 and the starting of a timer. The timer is set to a very brief time span, such as 250 milliseconds. This tricks the switch into believing that the user equipment answered the call and causes local switch 12 to stop ringing at its end. At the expiration of the timer, bandwidth allocator 38 may act according to the value of a trunk conditioning parameter for a predetermined time period. A reorder signal is provided to the far end subscriber during this predetermined time period. The term "reorder signal" is used herein to refer to any signal, whether it be data, tone, voice recoding, or equivalent thereof. For example, the reorder signal may be a fast busy tone. As shown in FIG. 3, the expiration of the timer causes a state transition from BLOCK RING SENDING OFF-HOOK state 69 to a BLOCK RING REORDER 1 state 65. During BLOCK RING REORDER 1 state 65, a first reorder signaling process may be performed. At the expiration of a first reorder timer, a state transition to a BLOCK RING REORDER 2 state 66 occurs. During BLOCK RING REORDER 2 state 66, a second reorder signaling process may be performed. After the time out of a second reorder timer, a state transition to BLOCK RING state 63 occurs.

As shown in FIG. 4, if the trunk conditioning parameter is set to a predetermined value, then an on-hook signal is sent to local switch 12 for the predetermined time period, such as 15 seconds. If the trunk conditioning parameter is set to another value, an off-hook signal may be sent to local switch 12 for 15 seconds. Alternatively, different signaling may be done for two or more stages during the same time period, such as off-hook for the first 2.5 seconds followed by 12.5 seconds of idle or on-hook. The signaling of these stages may be provisioned through the trunk condition parameter.

Blocking and unblocking messages, set forth in TABLE C above, are sent by the bandwidth allocator to the line cards. These messages contain the identifier of the line card and the block or unblock state of each channel on the line card. Upon the receipt of this message, the line card is required to cause its subscriber lines to enter the blocked or unblocked state as specified by the message.

Alternatively, another method of the all channel busy treatment to the far end subscriber may use a twisted pair coupled between the access multiplexing terminal's fuse and alarm panel 38 and the local switch. When an all channel busy condition occurs, the access multiplexing terminal provides a loop closure to the switch across these wires. While loop closure is present, the switch does not complete calls to the access multiplexing terminal and returns a reorder signal to all terminating calls.

Therefore as described above, when the ringing threshold or both the ringing and the off-hook thresholds are reached, further ringing are blocked. An all channel busy or reorder signal is provided to the far end subscriber, and no ringing to the near end subscriber is allowed. When only the off-hook threshold is reached, no dialing tone is provided to the near end subscriber that goes off-hook, so that no calls can be made. Operating in this manner, the number of ringing channels and off-hook channels are limited to ensure that power consumed by the access multiplexing terminal does not exceed the power level deliverable on the fixed and limited number of twisted pairs.

Although the detailed description herein pertains primarily to pair gain equipment, the present invention is applicable to other types of telecommunications equipment.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A method of power limiting call processing in a telecommunications equipment coupled between a plurality of far end subscriber lines and a plurality of near end subscriber lines, comprising:

monitoring and determining a number of subscriber lines that are ringing;

comparing the number of ringing subscriber lines to a predetermined ringing threshold;

blocking further ringing on subscriber lines in response to the number of ringing subscriber lines reaching or exceeding the predetermined ringing threshold; and providing a reorder signal to a blocked ringing far end subscriber line.

2. The method, as set forth in claim 1, further comprising:

monitoring and determining a number of subscriber lines that are off-hook;

comparing the number of off-hook subscriber lines to a predetermined off-hook threshold;

blocking further subscriber lines going off-hook in response to the number of off-hook subscriber lines reaching or exceeding the predetermined off-hook threshold; and not providing a dial tone to a blocked off-hook near end subscriber line.

3. The method, as set forth in claim 2, further comprising blocking both ringing subscriber lines and subscriber lines going off-hook in response to the number of ringing subscriber lines reaching or exceeding the predetermined ringing threshold and the number of off-hook subscriber lines reaching or exceeding the predetermined off-hook threshold.

4. The method, as set forth in claim 2, further comprising blocking both ringing subscriber lines and subscriber lines going off-hook in response to the number of off-hook subscriber lines reaching or exceeding the predetermined off-hook threshold.

5. The method, as set forth in claim 1, wherein providing the reorder signal comprises:

providing a first reorder signal for a first predetermined time period; and providing a second reorder signal for a second predetermined time period.

6. The method, as set forth in claim 5, wherein providing the reorder signal comprises:

providing the first reorder signal for 2.5 seconds; and providing the second reorder signal for 12.5 seconds.

7. The method, as set forth in claim 5, wherein sending the reorder signal comprises providing an off-hook signal for the first and second predetermined time period.

8. The method, as set forth in claim 5, wherein sending the reorder signal comprises providing an on-hook signal for the first and second predetermined time period.

9. The method, as set forth in claim 5, wherein providing the reorder signal comprises:

providing an off-hook signal for the first predetermined time period; and providing an idle signal for the second predetermined time period.

10. The method, as set forth in claim 5, wherein providing the reorder signal comprises:

providing an off-hook signal for the first predetermined time period; and providing an on-hook signal for the second predetermined time period.

11. The method, as set forth in claim 1, wherein providing the reorder signal comprises:

sending an off-hook signal to the far end subscriber line;

sending an on-hook signal to the far end subscriber line after sending the off-hook signal; and providing the reorder signal to the far end subscriber line.

12. An access multiplexing terminal coupled between a central office and a plurality of subscribers, comprising:

a first plurality of line cards coupled to a plurality of subscriber lines;

a second plurality of line cards;

a first plurality of twisted pairs coupling the second plurality of line cards to the central office;

a second plurality of twisted pairs coupling the access multiplexing terminal to a network power supply; and a bandwidth allocator monitoring a number of subscriber lines that are ringing and a number of subscriber lines that are off-hook, the bandwidth allocator blocking further ringing and off-hook subscriber lines in response to the numbers thereof exceeding predetermined ringing and off-hook thresholds.

13. A method of limiting power consumption in a telecommunications equipment coupled between a plurality of far end subscriber lines and a plurality of near end subscriber lines, comprising:

monitoring and determining a number of subscriber lines that are ringing;

comparing the number of ringing subscriber lines to a predetermined ringing threshold;

monitoring and determining a number of subscriber lines that are off-hook;

comparing the number of off-hook subscriber lines to a predetermined off-hook threshold;

blocking further ringing and/or off-hook subscriber lines in response to the number of ringing and/or off-hook subscriber lines reaching or exceeding the respective predetermined ringing and off-hook thresholds.

14. The method, as set forth in claim 13, further comprising providing a reorder signal to a blocked ringing far end subscriber line.

15. The method, as set forth in claim 13, further comprising not providing a dial tone to a blocked off-hook near end-subscriber line.

16. The method, as set forth in claim 13, wherein providing the reorder signal comprises:

providing a first reorder signal for a first predetermined time period; and providing a second reorder signal for a second predetermined time period.

17. The method, as set forth in claim 16, wherein providing the reorder signal comprises:

providing the first reorder signal for 2.5 seconds; and providing the second reorder signal for 12.5 seconds.

18. The method, as set forth in claim 16, wherein sending the reorder signal comprises providing an off-hook signal for the first and second predetermined time period.

19. The method, as set forth in claim 16, wherein sending the reorder signal comprises providing an on-hook signal for the first and second predetermined time period.

20. The method, as set forth in claim 16, wherein providing the reorder signal comprises:

providing an off-hook signal for the first predetermined time period; and providing an idle signal for the second predetermined time period.

21. The method, as set forth in claim 16, wherein providing the reorder signal comprises:

providing an off-hook signal for the first predetermined time period; and providing an on-hook signal for the second predetermined time period.

22. The method, as set forth in claim 13, wherein providing the reorder signal comprises:

sending an off-hook signal to the far end subscriber line;

sending an on-hook signal to the far end subscriber line after sending the off-hook signal; and providing the reorder signal to the far end subscriber line.

* * * * *